US007162623B2

(12) United States Patent
Yngvesson

(10) Patent No.: US 7,162,623 B2
(45) Date of Patent: Jan. 9, 2007

(54) METHOD FOR READING IMAGES

(75) Inventor: Jonas Yngvesson, Rimforsa (SE)

(73) Assignee: Sectra Imtec AB, Linköping (SE)

( * ) Notice: Subject to any disclaimer, the term of this patent is extended or adjusted under 35 U.S.C. 154(b) by 590 days.

(21) Appl. No.: 10/721,762

(22) Filed: Nov. 26, 2003

(65) Prior Publication Data
US 2004/0202387 A1 Oct. 14, 2004

(30) Foreign Application Priority Data
Nov. 29, 2002 (SE) .................................. 0203545

(51) Int. Cl.
G06F 9/24 (2006.01)
(52) U.S. Cl. .......................................... 713/1; 345/619
(58) Field of Classification Search .................... 713/1, 713/2, 100; 718/106; 345/619
See application file for complete search history.

(56) References Cited

U.S. PATENT DOCUMENTS 7,058,901 B1* 6/2006 Hafey et al. ................. 715/792
2003/0187689 A1* 10/2003 Barnes et al. ................... 705/2
2006/0181548 A1* 8/2006 Hafey et al. ................. 345/619

FOREIGN PATENT DOCUMENTS

EP 1207683 5/2002

OTHER PUBLICATIONS

A. Moise et al., Workflow Oriented Hanging Protocols for Radiology Workstation, Medical Imaging 2002, PACS and Integrated Medical Information Systems: Design and Evaluation, Proceedings of SPIE, vol. 4685, 2002, pp. 189-199.

* cited by examiner

Primary Examiner—Dennis M. Butler
(74) Attorney, Agent, or Firm—Venable LLP; Eric J. Franklin

(57) ABSTRACT

A method for reading images on a diagnostic workstation, wherein the method comprises the steps: a sequence of images is loaded into the workstation, a Dynamic Display Protocol (DDP) containing a set of rules included in a hanging protocol that automatically determines how the sequence of images is to be presented on at least one monitor for viewing the images is loaded into the workstation, a set of clinical applications is provided in a storage means, at least one of said clinical applications is configured as being a part of said hanging protocol, said Dynamic Display Protocol is checking if matching criterias for said hanging protocol are met by the sequence of images to be read and a clinical application being part of a hanging protocol which matching criterias are met by the sequence of images to be read is automatically started by said Dynamic Display Protocol.

11 Claims, 3 Drawing Sheets

METHOD FOR READING IMAGES

TECHNICAL FIELD

The present invention relates to a method for reading in a workstation a sequence of images obtained during an exam of a portion of a human body to facilitate the handling of the images for an operator and to make a diagnose simpler and more rapid.

TECHNICAL BACKGROUND

In order to facilitate and to make the handling of sequencies of images obtained during exams on the human body by means of imaging photographing devices, such as CT or MRI, during a reading of these images by a radiologist, there are functionality means provided in a computer workstation for reading these images. On a workstation for diagnostic image reading there is often a functionality called Dynamic Display Protocols (DDPs) installed. This is a set of rules that automatically decides how to present, on one or more monitors, the material available for reading.

Most workstations for diagnostic image reading support some sort of DDP concept. Different implementations of DDPs support different degrees of flexibility. Some of these simply check what type of image series is currently displayed and select a preset way of displaying the images. Other implementations take a lot of variables into consideration, such as, which user is viewing the images, what kind of examination has been performed, what kind of prior exams are available for comparison etc.

A DDP selected contain information about how the image material shall be presented. This information may be as simple as setting rules regarding how a screen on a monitor is divided to display a single series or it may contain quite complicated settings regarding which prior images to display together with the actual images, how to organize the images over the available monitors and image settings for individual images. This presentation specification associated with the Dynamic Display Protocol is called, in this connection, a hanging protocol. The hanging protocol usually includes information regarding the image series placement, viewing mode, layout, window width-level (W/L) settings, zoom and pan, image orientation, sorting of the series, splitting of the series into pseudo-series, stages etc. The use of hanging protocols in this branch of technology is disclosed in, for example, patent document EP 1 207 683 A2 and in the article: "Moise, Adrian & Atkins, M. Stella; Workflow oriented hanging protocols for radiology workstation; Proceedings of SPIE—The international Society for Optical Engineering, Volume 4685, 2002, pages 189–199. All of the contents of said documents are hereby included by reference into this description.

A clinical application is, in this context, a special application that performs a set of specific clinical tasks on a set of images. The clinical applications are not part of the diagnostic workstation software, but are external applications installed afterwards as helpware. However, the clinical applications may be started with a command available inside the diagnostic workstation software, whereby the desired clinical application is started and runs in a clinical context that is the same as for that of the workstation software in use. The context of the clinical application may include, such information as, patient, examinations and images. Some examples of clinical applications are: 3D rendering applications, Multi Planar Reconstruction and Orthopedic tools. Further examples of clinical applications are: Advanced measurement tools, Cardiology tools, Treatment planning, Image processing and analysis applications, CT and MR tools, Nuclear medicine tools, Teaching files and encyclopeida types of applications, Reporting tools. Computer Aided Diagnosis tools.

A clinical application can be an in-process plug-in, typically a dynamically loaded library or an external application running in its own address space. The important part is that it is started from inside the diagnostic workstation and automatically runs in the correct clinical context indicated by the user.

On the radiology workstation several clinical applications may be installed. DDPs today, as described, allow the diagnostic workstation software to present images series from examinations in a pre-defined way based on user preference and other criteria. However, if a certain clinical application is used regularly in the clinical work, that certain application needs to be started manually every time.

BRIEF DESCRIPTION OF THE INVENTION

According to one aspect of the present invention there is provided a method as characterized in the independent method claim.

The definition of a hanging protocol with the features as presented in the claims will contain a unique identifier for the clinical application. In the Windows world that is typically a GUID, containing the CLSID of a COM component implementing the application.

The hanging protocols are typically stored centrally on a server and are distributed on request to the diagnostic workstation. The workstation software will automatically start the clinical application in the correct clinical context if the criteria of the specific clinical application matches the criteria of the actual Dynamic Display Protocol running.

The new part in this scheme is the storage of a unique identifier of a clinical application in a hanging protocol, which allows the clinical application to be automatically started in the correct clinical context decided from a standard set of DDP matching criteria.

The advantage for a user is that clinical applications that are routinely used, can be incorporated in the normal automated workflow of a department, leading to improved efficency.

In an alternative embodiment the scheme above is combined with an automatic download and installation of the clinical application from a server, in case it is not already installed on the workstation host, when the hanging protocol indicates that the clinical application referred to should be applied. The server is either the server where the hanging protocol is stored and fetched, or another server indicated by an identifier also stored in the hanging protocol together with the unique identifier of the clinical application itself.

In still a further embodiment and enhancement, the configurations and settings made for one or more clinical applications and image specific settings inside one or more clinical applications are stored centrally on the same server as the hanging protocols. These configurations and settings can be viewed as manual modifications on the user level of the hanging protocol and are automatically fetched from the server and applied when the clinical applications are started. This is valuable since the clinical environment is very dynamic and it is common for users to access images from different workstation hosts at different times.

EMBODIMENTS OF THE INVENTION

A brief description for the proceedings to achieve the function according to the independent claims is presented below.

On a workstation a DDP with the desired option is created according to the steps:

1. Create Series Types

A series type definition is used to sort actual series into slots given in the examination types (see below). The definition is given on the form of criteria, as in the examination type case. The attributes are almost exclusively DICOM elements.

To create a series type a DDP editor in a workstation is used. A DDP definition window is started from a tools menu of an information window. A dialog regarding series types is reached from a file menu.

Figure 1:
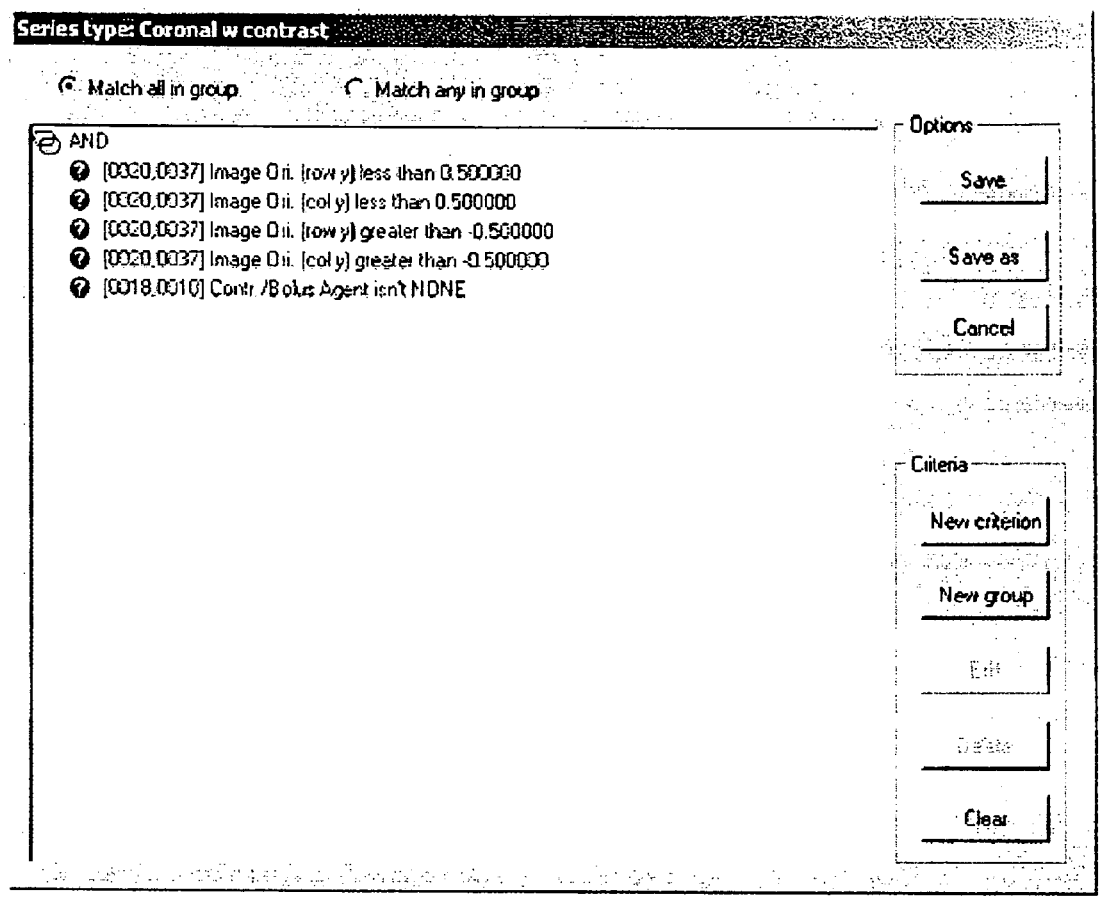
FIG. 1. A window in a workstation for setting DDP series type criteria.

The series type definition consists of a number of criteria. The criteria are presented in a tree view of the series type dialog. A criteria is defined by selecting among a number of predefined criteria. An existing criteria can be edited by selecting it and performing desired editing. An example of the setting of criterias by use of a window displayed at the workstation is shown in FIG. 1, wherein criteria, in this example for coronal with contrast, are set. As shown it is an option if the criteria listed may be matched as anyone from the group or that all criterias listed should be matched.

2. Create Examination Types

An Examination type definition has two purposes. Firstly, it must make it possible to match an actual examination to an examination type. This is used to see if an examination can be a part of a certain DDP. Secondly, it must list the included series. This is used when defining which series to be hung where in the DDP definition.

The first part, to describe distinctive characteristics, is given in the form of criteria. Each criterion consists of an attribute, a relation and a value, e.g. "Modality equals CR". The second part, to list included series types, is simply an ordered list of references to predefined series types.

To create an examination type a DDP editor in the workstation is used. The DDP definition window is started from the tools menu of the information window. A dialog for the examination types is reached from a file menu available at the workstation.

One part of the examination type is a number of criteria. The criteria are handled by a bottom part of the dialog. The handling is exactly the same as for series type criteria.

Figure 2:
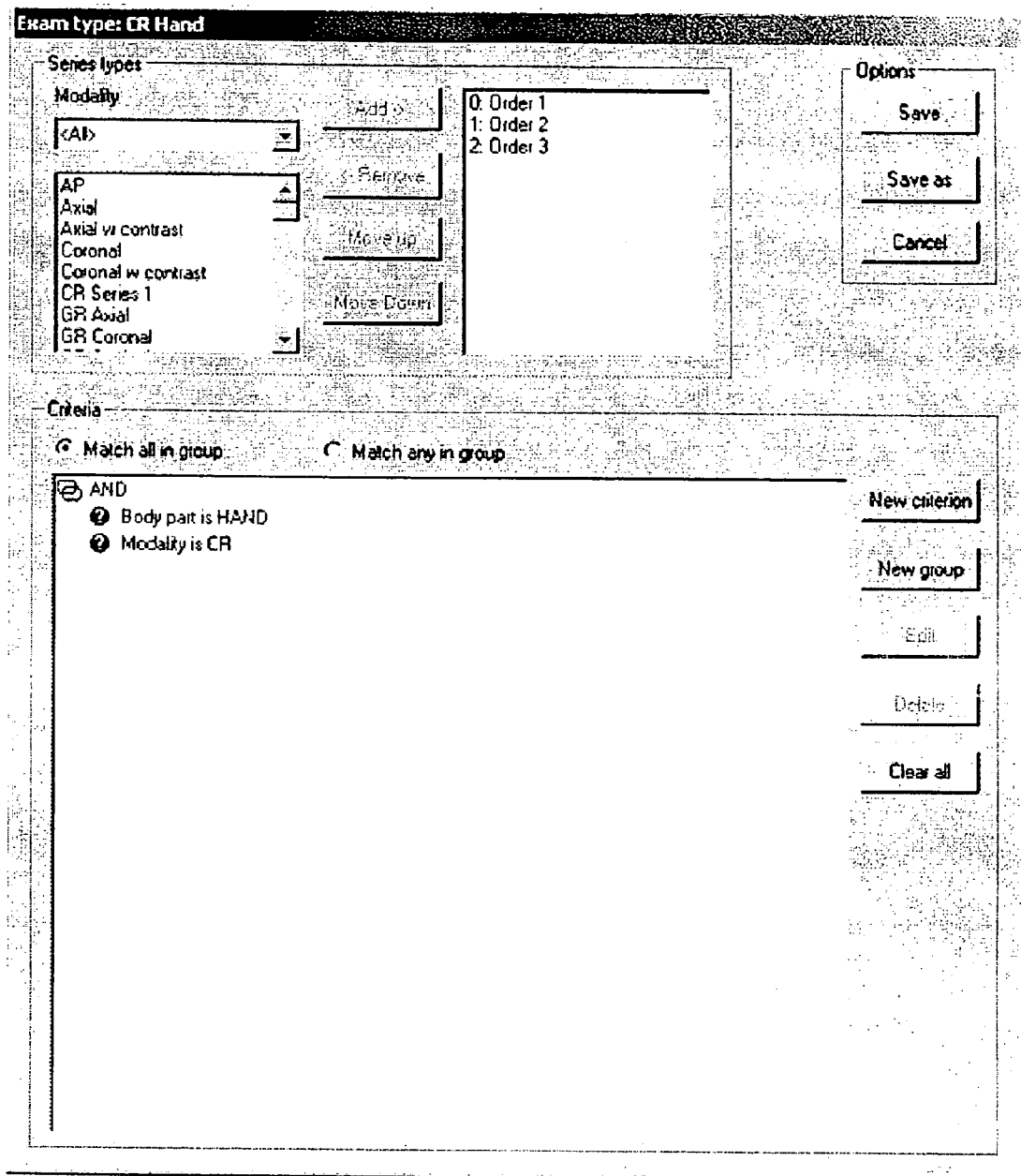
FIG. 2. A window in a workstation for choosing series types in an examination type.

The other part of the examination type is the list of series types, handled by a top part of the dialog. A left list box displayed on the screen of the workstation lists the available series types. A right list box displayed on the screen of the workstation shows the ordered list of series types in the examination type. By use of an add-button the selected series type in the left list is added to the right list. An example of how this is handled on a displayed window at a workstation is illustrated in FIG. 2.

3. Create DDP Definitions

To create a DDP definition, a DDP editor in the workstation is used. The DDP definition window is started from the tools menu of the information window.

Figure 3:
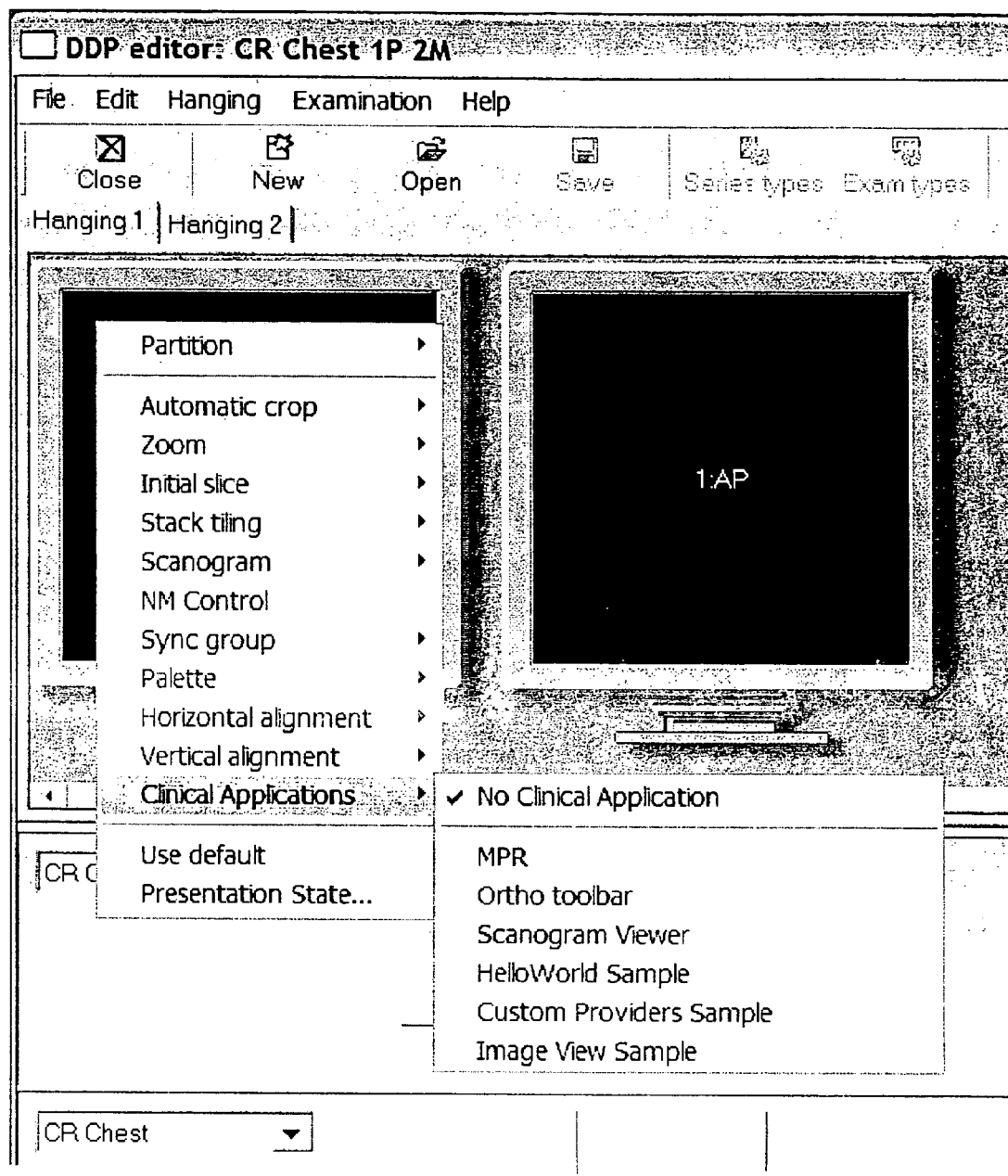
FIG. 3 shows a DDP editor on a workstation window.

An example of a DDP editor is shown in FIG. 3. A miniature monitor view is at the top and at the bottom there are examinations types, each containing a row of series types. In the figure below the examination type is CR Chest and the series types are AP and Lateral (not shown). The image being viewed is AP.

A new DDP can be created completely from scratch, but it is also possible to edit and remove existing DDPs. In the figure it is shown that also clinical applications is an option in the list of the DDP series types. The types of clinical applications available are listed in the window to the right in FIG. 3.

The normal workflow when creating a DDP is as follows:
Specifying the number of monitors that should be used.
Specifying the screen partitioning for each monitor.
Specifying which examinations that should be used.
Specifying where each series should be presented, i.e. hang the series.
Specifying image settings, including Clinical Applications.

There are different tools available for each of these tasks in the DDP editor. FIG. 3 displays the pop-up menu available to configure specific settings for a monitor and an image in a particular hanging. It also shows how a particular Clinical Application is selected to run for a particular image.

The invention claimed is:

1. Method for reading images on a diagnostic workstation, comprising:
   loading a sequence of images into the workstation,
   loading into the workstation a Dynamic Display Protocol containing a set of rules included in a hanging protocol that automatically determines how the sequence of images is to be presented on at least one monitor for viewing the images,
   providing a set of clinical applications in a storage means,
   configuring at least one of said clinical applications as being a part of said hanging protocol,
   checking by means of said Dynamic Display Protocol if matching criterias for said hanging protocol are met by the sequence of images to be read and
   automatically starting by said Dynamic Display Protocol a clinical application being part of a hanging protocol which matching criterias are met by the sequence of images to be read.

2. The method according to claim 1, further comprising:
   associating with said hanging protocol at least one image displaying specifics from the group of: viewing mode, layout, W/L-settings, zooming, image orientation, sorting of the image sequence, splitting of the image sequence into pseudo-series.

3. The method according to claim 2, further comprising:
   including in said set of clinical applications at least one from the group of:
   3D displaying application, Multi Planar application, Orthopedic tools, Advanced measurement tools, Cardiology tools, Treatment planning, Image processing and analysis applications, CT and MR tools, Nuclear medicine tools, Teaching files and encyclopaedia types of applications, Reporting tools, Computer Aided Diagnosis tools.

4. The method according to claim 3, further comprising:
   running said clinical application in a clinical context which is the same for the clinical application and for the software used on the workstation, wherein said clinical context is one from the group of: patient identity, instance(s) of examination, instance(s) of images.

5. The method according to claim 4, further comprising:
identifying the clinical applications with a unique identifier.

6. The method according to claim 5, further comprising:
storing said clinical application on the diagnostic workstation host.

7. The method according to claim 5, further comprising:
storing said clinical application on a server and
starting said clinical application on request by the Dynamic Display Protocol.

8. The method according to claim 5, further comprising:
storing said clinical application on a server,
installing said clinical application into the diagnostic workstation on request by the Dynamic Display Protocol and
starting said clinical application on request by the Dynamic Display Protocol.

9. The method according to claim 7, further comprising:
storing in said hanging protocol an identifier of the server storing the clinical application together with the identifier of the clinical application itself.

10. The method according to claim 7, further comprising:
storing the configurations and settings for a clinical application on the same server as the one where the hanging protocol is stored.

11. The method according to claim 10, further comprising:
storing the image specific settings associatied associated with a clinical application on the same server as the one where the hanging protocol is stored.

* * * * *